US011989655B2

(12) United States Patent
Luo et al.

(10) Patent No.: US 11,989,655 B2
(45) Date of Patent: May 21, 2024

(54) PREDICTION METHOD, DEVICE AND SYSTEM FOR ROCK MASS INSTABILITY STAGES

(71) Applicant: JIANGXI UNIVERSITY OF SCIENCE AND TECHNOLOGY, Ganzhou (CN)

(72) Inventors: Xiaoyan Luo, Ganzhou (CN); Hui Yu, Ganzhou (CN); Tao Deng, Ganzhou (CN); Junxi Liu, Ganzhou (CN); Xuetao Zhang, Ganzhou (CN)

(73) Assignee: JIANGXI UNIVERSITY OF SCIENCE AND TECHNOLOGY, Ganzhou (CN)

( * ) Notice: Subject to any disclaimer, the term of this patent is extended or adjusted under 35 U.S.C. 154(b) by 876 days.

(21) Appl. No.: 17/079,677

(22) Filed: Oct. 26, 2020

(65) Prior Publication Data

US 2022/0129757 A1 Apr. 28, 2022

(51) Int. Cl.
*G06N 3/084* (2023.01)
*G06N 3/04* (2023.01)
(Continued)

(52) U.S. Cl.
CPC ............... *G06N 3/084* (2013.01); *G06N 3/04* (2013.01); *G06N 3/082* (2013.01); *G06N 3/126* (2013.01);
(Continued)

(58) Field of Classification Search
CPC .......... G06N 3/084; G06N 3/04; G06N 3/082; G06N 3/126; G06N 5/022; G10L 25/03; G10L 25/30; G10L 25/51
See application file for complete search history.

(56) References Cited

U.S. PATENT DOCUMENTS

| | | | | |
|---|---|---|---|---|
| 2001/0025232 A1* | 9/2001 | Klimasauskas | ...... | G05B 13/027 703/13 |
| 2017/0131192 A1 | 5/2017 | Perez | | |
| 2018/0300630 A1* | 10/2018 | Andoni | ................. | G06F 16/245 |

FOREIGN PATENT DOCUMENTS

| | | |
|---|---|---|
| CN | 101770038 A | 7/2010 |
| CN | 103018338 A | 4/2013 |

(Continued)

OTHER PUBLICATIONS

Brink, "Development of an Acoustic Classification System for Predicting Rock Structural Stability", 2015 (Year: 2015).*

(Continued)

*Primary Examiner* — Abdullah Al Kawsar
*Assistant Examiner* — William P Plefka
(74) *Attorney, Agent, or Firm* — WPAT, PC

(57) ABSTRACT

Embodiments of the present application provide a prediction method, device and system for rock mass instability stages, and belong to the technical field of rock mass instability prediction. The method includes the steps: acquiring acoustic emission signals of rock mass; extracting feature parameters from the acquired acoustic emission signals; and predicting instability stages of the rock mass in accordance with the feature parameters and a preset back propagation (BP) neural network model, wherein the preset BP neural network model is obtained by training a BP neural network and a genetic algorithm by virtue of the feature parameters of the acoustic emission signals at different rock mass instability stages. According to the technical solution in the present application, the problem in the training process of the BP neural network model that model parameter optimization may be easily trapped in a locally optimal solution is effectively solved.

6 Claims, 5 Drawing Sheets

(51) Int. Cl.
  *G06N 3/082* (2023.01)
  *G06N 3/126* (2023.01)
  *G06N 5/022* (2023.01)
  *G10L 25/03* (2013.01)
  *G10L 25/30* (2013.01)
  *G10L 25/51* (2013.01)

(52) U.S. Cl.
  CPC .............. *G06N 5/022* (2013.01); *G10L 25/03* (2013.01); *G10L 25/30* (2013.01); *G10L 25/51* (2013.01)

(56) References Cited

FOREIGN PATENT DOCUMENTS

| | | |
|---|---|---|
| CN | 105260575 A | 1/2016 |
| CN | 109409568 A | 3/2019 |

OTHER PUBLICATIONS

Yi, "Selection of Initial Weights and Thresholds Based on the Genetic Algorithm with the Optimized Back Propagation Neural Network", 2015 12th International Conference on Fuzzy Systems and Knowledge Discovery (Year: 2015).*

Chen et al., "The genetic algorithm based back propagation neural network for MMP prediction in CO2-EOR process" Fuel vol. 126, Jun. 15, 2014, pp. 202-212 (Year: 2014).*

Pan et al. "Survival prediction for oral tongue cancer patients via probabilistic genetic algorithm optimized neural network models", The British journal of radiology vol. 93, 1112 (2020) (Year: 2020).*

Zhu et al., "Comprehensive analysis and artificial intelligent simulation of land subsidence of Beijing, China", Chinese Geographical Science vol. 23, pp. 237-248 (2013) (Year: 2013).*

Zhang et al., "Estimation of Rock Mass Rating System with an Artificial Neural Network", 2009, Advances in Neural Networks—ISNN 2009 pp. 963-972 (Year: 2009).*

* cited by examiner

PREDICTION METHOD, DEVICE AND SYSTEM FOR ROCK MASS INSTABILITY STAGES

FIELD OF THE INVENTION

The present application relates to the technical field of rock mass instability prediction, particularly to a prediction method for rock mass instability stages, a prediction device for the rock mass instability stages, and a prediction system for the rock mass instability stages.

BACKGROUND OF THE INVENTION

Prediction of rock stability is particularly important for underground mining engineering, in order to ensure safety production in mines. However, because of nonlinear and anisotropic mechanical properties, an internal state of the rock mass is difficult to judge, while existing theoretical calculation methods are not mature yet at present, and the rock mass instability is affected by too many factors, so that existing theoretical calculation formulas are difficultly applied to engineering practice. CN201510788783.9 discloses a method for predicting roadway surrounding rock deformation by utilizing a neural network. The deformation of the surrounding rock is predicted by utilizing a BP neural network by virtue of indexes such as a roadway section size, a buried depth, rock mechanical parameters and heterogeneity of surrounding rock. However, many parameters need to be acquired and input, and a calculated quantity is high. Moreover, only the deformation of the surrounding rock can be predicted, while instability stages of the rock mass cannot be predicted; and an application range is limited.

SUMMARY OF THE INVENTION

A purpose of embodiments of the present application is to provide a prediction method, device and system for rock mass instability stages, for solving a problem of difficulty in predicting the rock mass instability stages.

In an aspect, the present invention provides a prediction method for rock mass instability stages, comprising the steps:
acquiring acoustic emission signals of rock mass;
extracting feature parameters from the acquired acoustic emission signals; and
predicting instability stages of the rock mass in accordance with the feature parameters and a preset BP neural network model, wherein the preset BP neural network model is obtained by training a BP neural network and a genetic algorithm by virtue of the feature parameters of the acoustic emission signals at different rock mass instability stages.

Optionally, a training process of the preset BP neural network model comprises the following steps:
acquiring acoustic emission signals of different rock mass instability stages and extracting feature parameters of the acoustic emission signals of different rock mass instability stages;
dividing all the extracted feature parameters of the acoustic emission signals of different rock mass instability stages into a training set and a test set;
training the BP neural network in accordance with the training set and the genetic algorithm so as to obtain an initial BP neural network model; and
verifying the initial BP neural network model according to the test set, thereby obtaining the preset BP neural network model.

Optionally, the preset BP neural network model is of a single-input single-output structure.

Optionally, the feature parameters of the acoustic emission signals of different rock mass instability stages are ring-down count or energy count.

Optionally, a process of obtaining the initial BP neural network model comprises the steps:
determining the number of nodes in an input layer and an output layer of the BP neural network model in accordance with categories of the feature parameters in the training set and the rock mass instability stages;
determining the number of nodes in a hidden layer of the BP neural network in accordance with cut-and-trial;
initializing a weight and a threshold of the BP neural network;
optimizing the weight and threshold of the BP neural network by virtue of the genetic algorithm; and
training the BP neural network in accordance with the feature parameters in the training set and the corresponding rock mass instability stages, acquiring an error between a predicted output value and an expected output value of the BP neural network, and updating the weight and the threshold of the BP neural network by virtue of back propagation until the error between the predicted output value and the expected output value is smaller than a first set value, thereby obtaining the initial BP neural network model.

Optionally, a process of optimizing the weight and threshold of the BP neural network by virtue of the genetic algorithm comprises the steps:
setting population parameters comprising population size, evolution frequency, crossover probability and mutation probability;
conducting real number encoding on parameters of the BP neural network, wherein the parameters comprise the weight and the threshold of the BP neural network; and
calculating fitness of individuals, selecting an optimal individual from the current population according to the fitness of individuals, executing crossover and mutation operations until optimization conditions are met, and selecting optimum weight and threshold to update the initial weight and threshold of the BP neural network.

Optionally, the fitness of individuals is inversely proportional to the error between the predicted output value and the expected output value of the initial BP neural network model.

In a further aspect, the present invention provides a prediction device for rock mass instability stages, comprising:
a data acquisition unit, configured to acquire acoustic emission signals of rock mass;
a feature extraction unit, configured to extract feature parameters from the acquired acoustic emission signals; and
a prediction unit, configured to predict instability stages of the rock mass in accordance with the feature parameters and a preset BP neural network model, wherein the preset BP neural network model is obtained by training a BP neural network and a genetic algorithm by virtue of the feature parameters of the acoustic emission signals at different rock mass instability stages.

In a further aspect, the present invention provides a prediction system for rock mass instability stages, comprising:

an acoustic emission sensor connected to a network; and the device of the present application connected to the network, wherein the data acquisition unit of the device acquires acoustic emission signals of rock mass acquired by the acoustic emission sensor via the network.

According to the technical solution in the present application, a BP neural network model is built by taking feature parameters of acoustic emission signals as input and taking corresponding rock mass instability stages as output, thereby predicting the rock mass instability stages; and the parameters of the BP neural network model are optimized by a genetic algorithm, so that a problem in a training process of the BP neural network model that model parameter optimization may be easily trapped in a locally optimal solution is effectively solved, thereby increasing prediction accuracy. Meanwhile, only the feature parameters of the acoustic emission signals of the rock mass need to be acquired as input in the present application, so that the calculated quantity is effectively decreased.

Other features and advantages of the embodiments of the present application will be described in detail in subsequent specific embodiments.

BRIEF DESCRIPTION OF DRAWINGS

Drawings are used for providing a further understanding of embodiments of the present application, and form one part of the description. The drawings and specific embodiments below are used for illustrating the embodiments of the present application together, rather than forming a limitation of the embodiments of the present invention. In the drawings.

REFERENCE SYMBOLS

100—prediction device; 110—data acquisition device; 120—feature extraction unit; 130—prediction unit.

DETAILED DESCRIPTION OF THE EMBODIMENTS

Specific embodiments of the present application are described below in detail in combination with drawings. It should be understood that, specific embodiments described herein are merely used for describing and explaining the present application, rather than a limitation of the present application. In embodiments of the present application, terms "comprise", "include" or any other variant are intended to cover non-exclusive inclusion, so that the processes, methods, commodities or equipment including a series of factors not only include those factors, but also include other factors listed implicitly, or further include inherent factors of the processes, methods, commodities or equipment. In the absence of more limitations, the factors defined by the statement "include one . . . " do not exclude other identical factors in the processes, methods, commodities or equipment including said factors.

Figure 1:
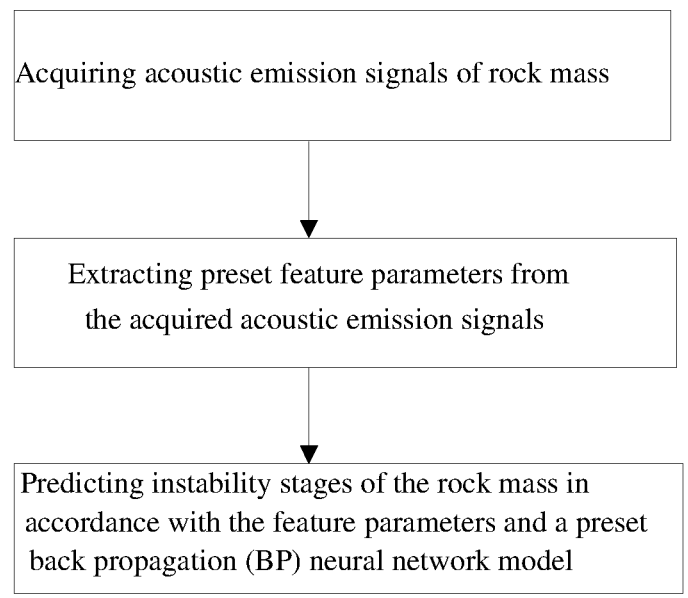
FIG. 1 is a flowchart of a prediction method for rock mass instability stages provided by an embodiment of the present application.

As shown in FIG. 1, embodiments of the present application provide a prediction method for rock mass instability stages. The method includes the steps:

acquiring acoustic emission signals of rock mass;

extracting feature parameters from the acquired acoustic emission signals; and predicting instability stages of the rock mass in accordance with the feature parameters and a preset back propagation (BP) neural network model, wherein the preset BP neural network model is obtained by training a BP neural network and a genetic algorithm by virtue of the feature parameters of the acoustic emission signals at different rock mass instability stages.

Thus, according to embodiments of the present application, the BP neural network model is built by taking the feature parameters of the acoustic emission signals as input and taking corresponding rock mass instability stages as output, thereby predicting the rock mass instability stages; and the parameters of the BP neural network model are optimized by the genetic algorithm, so that a problem in the training process of the BP neural network model that model parameter optimization may be easily trapped in a locally optimal solution is effectively solved, thereby increasing prediction accuracy. Meanwhile, only the feature parameters of the acoustic emission signals of the rock mass need to be acquired as input in the present application, so that the calculated quantity is effectively decreased.

Specifically, massive experiments indicate that, the whole rock mass instability fracture process is accompanied by an acoustic emission phenomenon, and different acoustic emission features exist at different instability stages. Acoustic emission signals acquired in the rock mass instability process are divided into four stages according to rock mass stress conditions as follows: a stage I, i.e., a compaction stage; a stage II, i.e., an elastic deformation stage; a stage III, i.e., a plastic deformation stage, and a stage IV, i.e., a post-peak failure stage; the acoustic emission signals at the four stages are respectively selected for performing feature parameter extraction; and the extracted feature parameters serve as input of the BP neural network, and the BP neural network is trained, thereby obtaining a BP neural network model that takes the feature parameters of the acoustic emission signals as the input and takes the rock mass instability stages as the output. The BP neural network is capable of storing and updating a mapping relation between the feature parameters of the acoustic emission signals and the rock mass instability stages in a self-learning manner, while a mapping relation between lots of the feature parameters of the acoustic emission signals and the rock mass instability stages does not need to be stored in advance. By predicting the rock mass instability stages by virtue of the acoustic emission signals, few feature parameters are input, and a calculated quantity of data processing is effectively decreased, thereby increasing a calculation rate of the prediction process. Therefore, the rock mass instability stages can be rapidly predicted by the BP neural network according to the input feature parameters of the acoustic emission signals, thereby effectively avoiding safety problems caused by rock mass instability.

Further, to obtain the preset BP neural network model, the BP neural network should be trained by virtue of lots of rock mass instability acoustic emission signals. Therefore, the BP neural network is trained by procedures as follows:

acquiring acoustic emission signals of different rock mass instability stages, and extracting feature parameters of the acoustic emission signals of different rock mass instability stages;

dividing all the extracted feature parameters of the acoustic emission signals of different rock mass instability stages into a training set and a test set;

training the BP neural network in accordance with the training set and the genetic algorithm so as to obtain an initial BP neural network model; and verifying the initial BP neural network model according to the test set, thereby obtaining the preset BP neural network model.

Specifically, in one embodiment, lots of acoustic emission signals of rock mass at different instability stages are acquired in advance; the acquired rock mass instability acoustic emission signals are divided according to four stages of rock mass instability; 20 groups of acoustic emission signals are intercepted at each corresponding stage according to an identical time interval; the length of each group of acoustic emission signals is 2048 data points; each data point is a pulse signal data; totally 80 groups of the acoustic emission signals are intercepted; and feature parameters of each group of the acoustic emission signals are extracted. All the extracted feature parameters are divided into a training set and a test set. In the present embodiment, 40 groups of feature parameters are randomly selected as the training set, while the remaining 40 groups of feature parameters serve as the test set. A specific division ratio may be adjusted according to actual conditions. Initial parameters of the BP neural network are optimized by the genetic algorithm, the feature parameters in the training set are input into the BP neural network, and the parameters of the BP neural network are adjusted in accordance with an error between an output value and an expected value of the BP neural network. When the error between the output result and the expected result of the BP neural network meets a certain standard or reaches the maximum number of iterations, it is considered that training of the BP neural network is completed, and the initial BP neural network model is obtained. The initial BP neural network model is verified by taking the feature parameters in the test set as input, and prediction accuracy of the neural network model is tested. If the prediction accuracy does not meet requirements, the BP neural network is subjected to parameter adjustment, and the above training process is repeated until the prediction accuracy meets the requirements, thereby obtaining the preset BP neural network model.

Further, the preset BP neural network model is of a single-input single-output structure. A single hidden layer is arranged between an input layer and an output layer of the preset BP neural network model. The input layer takes the feature parameters of the acoustic emission signals of the rock mass as input, while the output layer takes a rock mass instability stage corresponding to a certain identified feature parameter as output.

Further, the feature parameters of the acoustic emission signals of different rock mass instability stages may be ring-down count or energy count. In the present embodiment, the ring-down count serves as a preset feature parameter of the acoustic emission signals. The ring-down count represents a ring-down pulse frequency that exceeds a set threshold in a group of sampled acoustic emission signals. By taking that a length of each group of the acoustic emission signals is 2048 data points as an example, each group of the acoustic emission signals includes 2048 pulse signal data. The ring-down pulse frequency that exceeds the set threshold in the 2048 data points is calculated, so that the ring-down count of each group of the acoustic emission signals is obtained, thereby obtaining the ring-down count corresponding to the acquired acoustic emission signals at each stage in the present embodiment, as shown in Table 1:

TABLE 1

| Instability stage | Stage I | Stage II | Stage III | Stage IV |
|---|---|---|---|---|
| 1 | 9 | 49 | 79 | 16 |
| 2 | 8 | 37 | 51 | 21 |
| 3 | 6 | 46 | 68 | 15 |
| 4 | 1 | 42 | 77 | 18 |
| 5 | 5 | 38 | 91 | 28 |
| 6 | 4 | 60 | 78 | 26 |
| 7 | 7 | 32 | 89 | 19 |
| 8 | 38 | 41 | 111 | 20 |
| 9 | 38 | 35 | 90 | 21 |
| 10 | 46 | 44 | 205 | 15 |
| 11 | 33 | 42 | 90 | 21 |
| 12 | 39 | 51 | 88 | 23 |
| 13 | 55 | 47 | 97 | 19 |
| 14 | 39 | 35 | 78 | 22 |
| 15 | 27 | 38 | 89 | 17 |
| 16 | 26 | 36 | 64 | 31 |
| 17 | 35 | 41 | 142 | 19 |
| 18 | 32 | 27 | 79 | 22 |
| 19 | 37 | 32 | 90 | 31 |
| 20 | 28 | 41 | 101 | 21 |

Figure 2:
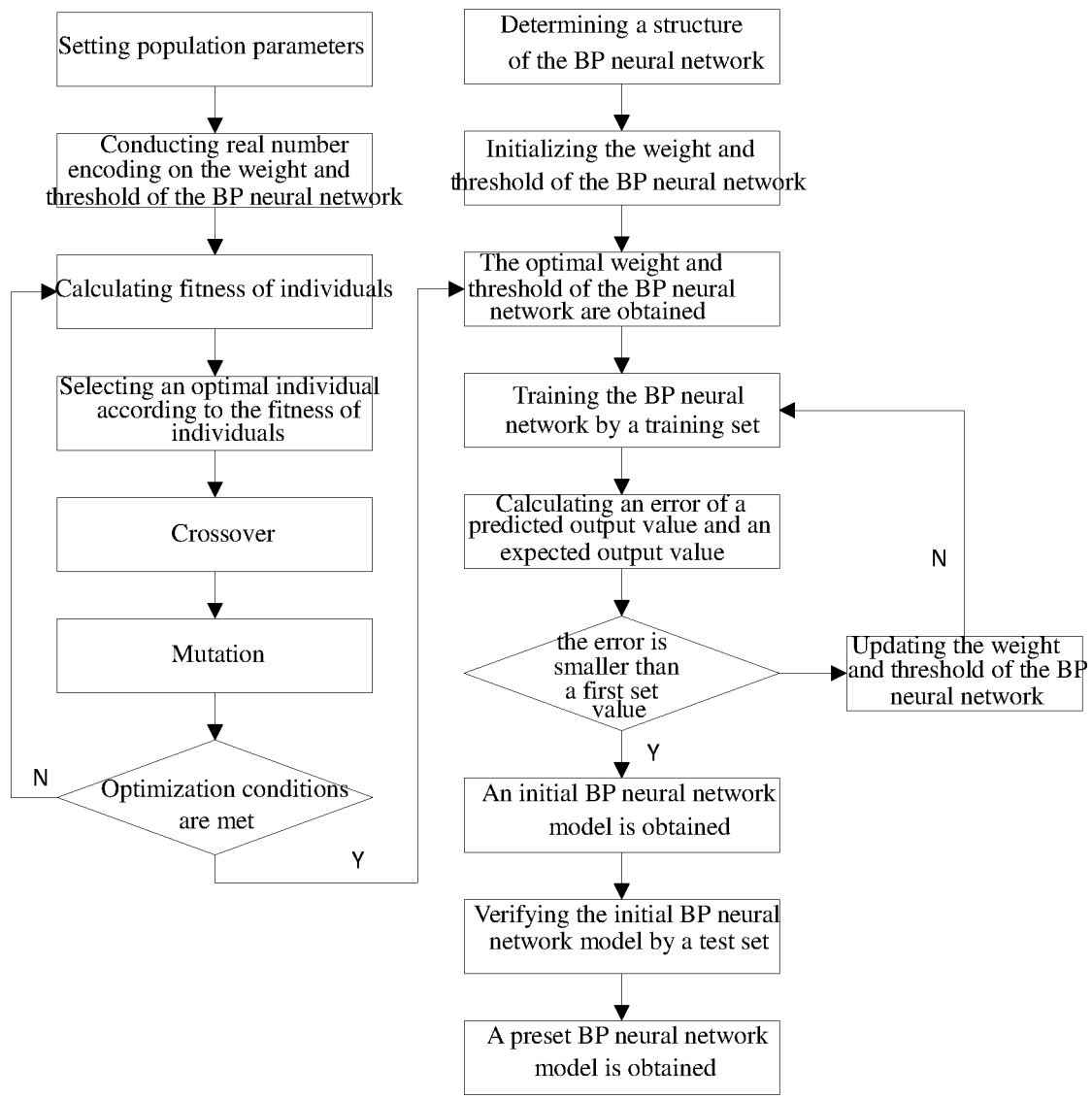
FIG. 2 is a flowchart of training of an initial BP neural network model provided by an optional embodiment of the present application.

As shown in FIG. 2, a specific process of obtaining the initial BP neural network model includes the steps:

determining the number of nodes in an input layer and an output layer of the BP neural network model in accordance with categories of the feature parameters in the training set and the rock mass instability stages;

determining the number of nodes in a hidden layer of the BP neural network in accordance with cut-and-trial;

initializing a weight and a threshold of the BP neural network;

optimizing the weight and threshold of the BP neural network by virtue of the genetic algorithm; and training the BP neural network in accordance with the feature parameters in the training set and the corresponding rock mass instability stages, acquiring an error between a predicted output value and an expected output value of the BP neural network, and updating the weight and the threshold of the BP neural network by virtue of back propagation until the error between the predicted output value and the expected output value is smaller than a first set value, thereby obtaining the initial BP neural network model.

Specifically, the BP neural network is constructed first. In the present embodiment, the feature parameter is the ring-down count, and the input data is one-dimensional data, so the number of nodes in the input layer is 1; output of the output layer is the rock mass instability stage corresponding to the ring-down count of the input, so the number of the nodes in the output layer is also 1. The number of nodes in the hidden layer is determined as 5 according to cut-and-trial. An S function is selected as a neuron transfer function of the hidden layer, specifically a logsig function. A linear activation function is selected as a neuron transfer function of the output layer, specifically a purelin function. The training function is a training function. A mean square error (mse) is selected as a loss function. A learning rate is set as 0.001. The number of iterations is 100.

The process of training the BP neural network is as follows:

The weight and the threshold of the BP neural network are initialized and optimized by virtue of the genetic algorithm; the feature parameters in the training set are taken as the input; and the input value $Y_i$ and the output value $H_i$ of the hidden layer are calculated according to the following formula:

$$Y_i = \Omega_i x + a_i$$

$$H_i = f(\Omega_i x + a_i)$$

The output value of the hidden layer serves as the input, and the input value T of the output layer and the output value 0 of the output layer are calculated according to the following formula:

$$T = \sum_{i=1}^{q} \omega_i H_i + b$$

$$O = \phi\left(\sum_{i=1}^{q} \omega_i H_i + b\right)$$

The input value of the output layer and the output value of the output layer are taken as the input; and the error between the output value and the expected value of the BP neural network is calculated by a mean square error equation. The mean square error equation is as follows:

$$E = \frac{1}{2}(T - 0)^2$$

If the error between the output value and the expected value of the BP neural network is greater than a first set value, the input value of the output layer and the output value of the output layer are taken as the input so as to perform back propagation. The weight and threshold of the hidden layer and the output layer are updated according to the following formulas:

$$\omega_i = \mu \sum_{p=1}^{p} (T_p - O_p) \times \phi'(T) \times \omega_i \times f'(Y_i) * \frac{\partial Y_i}{\partial \omega_i}$$

$$\omega = \mu \sum_{p=1}^{p} (T_p - O_p) \times \phi'(T) \times \frac{\partial T}{\partial \omega}$$

$$a_i = \mu \sum_{p=1}^{p} (T_p - O_p) \times \phi'(T) \times \omega_i \times f'(Y_i)$$

$$b = \mu \sum_{p=1}^{p} (T_p - O_p) * \phi'(T)$$

In the formulas, an input sample is $X=(x_1, x_2, x_3 \ldots x_p)$; $T_p$ represents an input value of the input pth sample on the output layer; $0_p$ represents an output value of the input pth sample on in the output layer; $\Omega_i$ is a weight of the hidden layer; $\Omega$ is a weight of the output layer; a threshold of the hidden layer is $a_i$; a threshold of the output layer is b; f is a transfer function of the hidden layer; $\phi$ is a transfer function of the output layer; i (i=1, 2 . . . , 5) is a node of the hidden layer; and $\mu$ is a constant.

The training process is repeated, so that the weights and thresholds of the layers are gradually adjusted according to the output value and the expected value of the BP neural network until the error between the predicted output value and the expected output value of the BP neural network is smaller than the first set value, thereby obtaining the initial BP neural network model.

Further, the traditional BP neural network is easily trapped in a locally optimal solution in the training process, and then a parameter optimization effect of the BP neural network is not the best, so that stability of the neural network is poor, thereby affecting the prediction accuracy. Therefore, by optimizing the weight and threshold of the BP neural network by the genetic algorithm in the present embodiment, the BP neural network is effectively prevented from being trapped in a locally optimal solution. The optimization process includes the following steps:

setting population parameters, wherein the population parameters include population size, evolution frequency, crossover probability and mutation probability;

conducting real number encoding on the parameters of the BP neural network, wherein the parameters include the weight and the threshold of the BP neural network; and calculating fitness of individuals, selecting an optimal individual from the current population according to the fitness of individuals, executing crossover and mutation operations until optimization conditions are met, and selecting the optimum weight and threshold to update the initial weight and threshold of the BP neural network.

Specifically, genetic algorithm parameter setting is performed first. In the present embodiment, the population size is set as 20; the evolution frequency, the crossover probability and the mutation probability may be set according to specific conditions; and a length of each chromosome may be calculated by the following formula:

$$L = n \times m + m \times s + m + s$$

In the formula, L is the chromosome length; n is the number of nodes in the input layer; m is the number of nodes in the output layer; and s is the number of nodes in the hidden layer. Thus, in the present embodiment, the chromosome length is L=1×1+1×5+1+5, and L is equal to 12.

The weights and thresholds of the layers of the BP neural network are respectively subjected to real number encoding so as to obtain chromosome individuals having the length of 12, and fitness values of the individuals are calculated one by one.

With the adoption of roulette wheel selection, the individuals are randomly selected to be subjected to crossover and mutation operations in accordance with the fitness values of the individuals. The selected probability of the individuals is in direct proportion to the fitness value during roulette wheel selection, and a specific calculation formula is as follows:

$$p(i) = \frac{G(i)}{\sum_{i=1}^{N} G(i)}$$

In the formula, N is the population size; the fitness value of each individual is G(i); and the selected probability of the individuals is p(i).

Because of the real number encoding rule, arithmetic crossover is selected by a crossover operator, so that a novel individual is obtained from two individuals by virtue of linear transformation. Random original value mutation is selected by a mutation operator. A calculation formula of the arithmetic crossover is as follows:

$$\begin{cases} X_1' = k \times X_1 + (1-k) \times X_2 \\ X_2' = (1-k) \times X_1 + k \times X_2 \end{cases}$$

In the formula, $X_1$ and $X_2$ respectively represent original individuals; $X'_1$ and $X'_2$ are respectively novel individuals; and k is a constant of 0-1.

The population is updated once when a round of selection, crossover and mutation is executed, and fitness of the individuals in the population is calculated again. Partial individuals of high fitness are selected to form a new population, and operations such as selection, crossover and mutation are continuously conducted on the individuals, so that the population is constantly iterated until the fitness value of each individual in the population is greater than a preset threshold, thereby obtaining the optimal solution and obtaining the optimal weight and threshold. Moreover, the obtained optimal weight and threshold serve as the initial weight and threshold of the BP neural network. The initial weight and threshold of the BP neural network are optimized by the genetic algorithm, so that the weight and threshold of the BP neural network dynamically change along with training in the training process, thereby avoiding the BP neural network from being trapped in a locally optimal solution in the training process and increasing the stability of the BP neural network.

Further, the fitness of the individuals is inversely proportional to the error between the predicted output value and the expected output value of the initial BP neural network model. Therefore, the fitness of the individuals may be calculated by the following formula in the process:

$$G(x) = \frac{1}{E(x) + 1}$$

In the formula, G(x) represents a fitness function; and E(x) represents a mean square error function.

Figure 3:
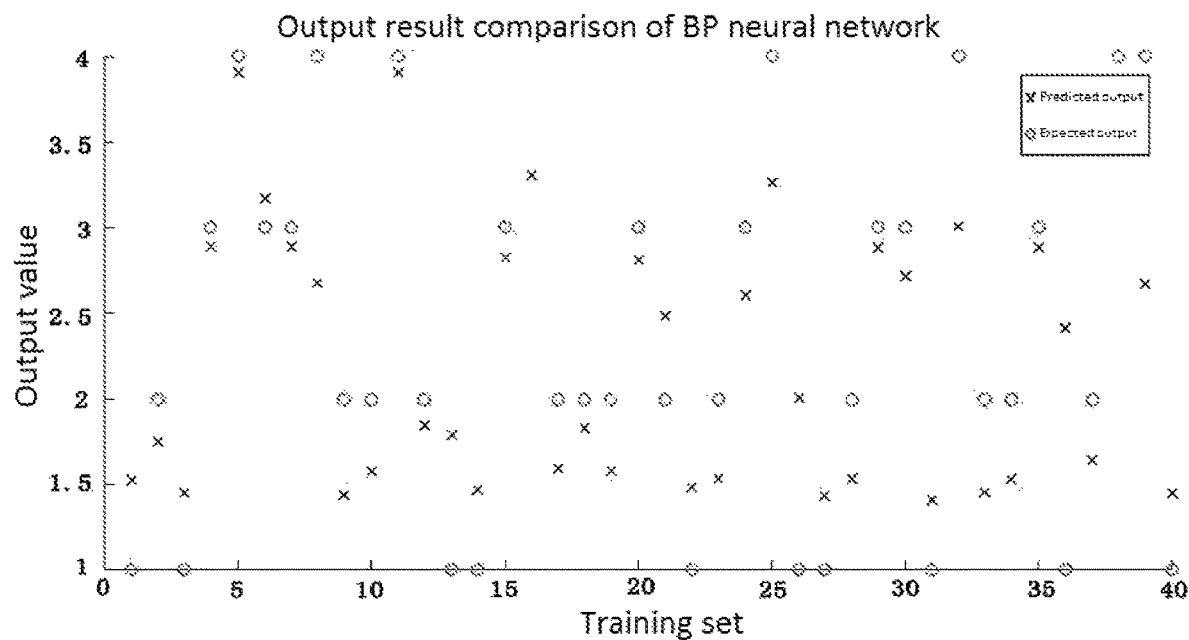
FIG. 3 is a comparison diagram of a predicted output value and an expected value of a BP neural network provided by an optional embodiment of the present application.
Figure 4:
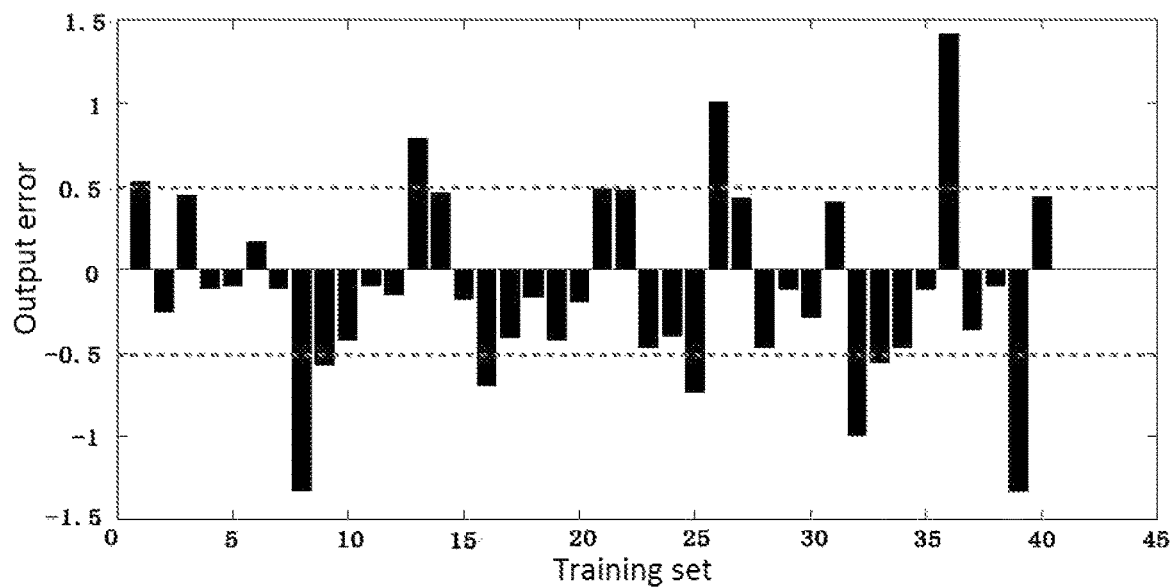
FIG. 4 is an output error diagram of a predicted output value and an expected value of a BP neural network provided by an optional embodiment of the present application.
Figure 5:
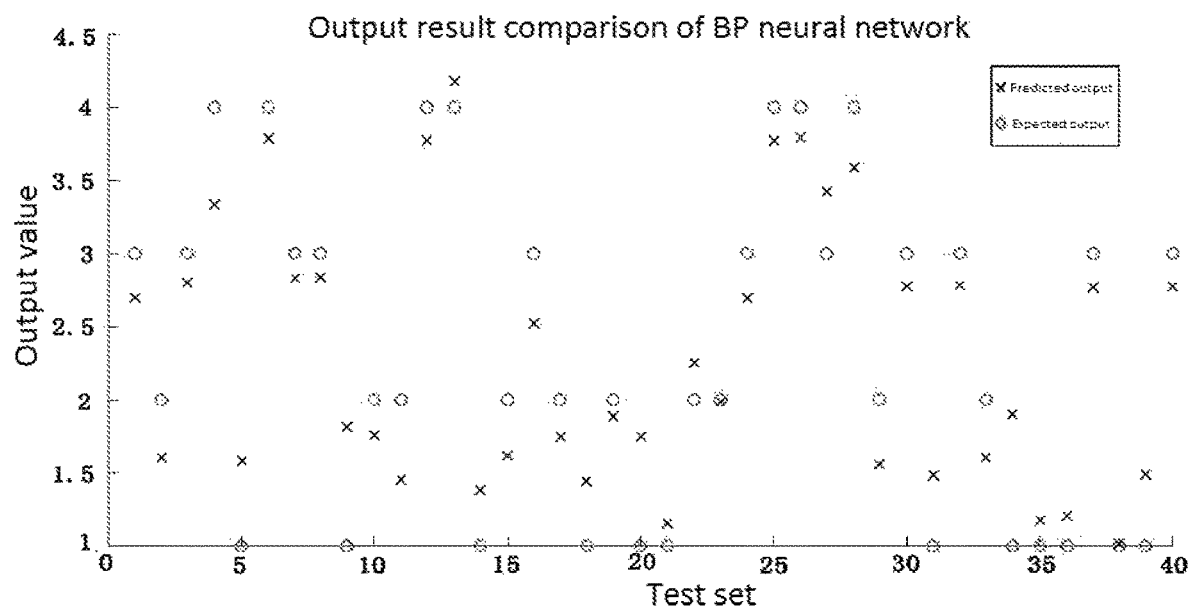
FIG. 5 is a comparison diagram of a predicted output value and an expected value of a preset BP neural network model provided by an optional embodiment of the present application.
Figure 6:
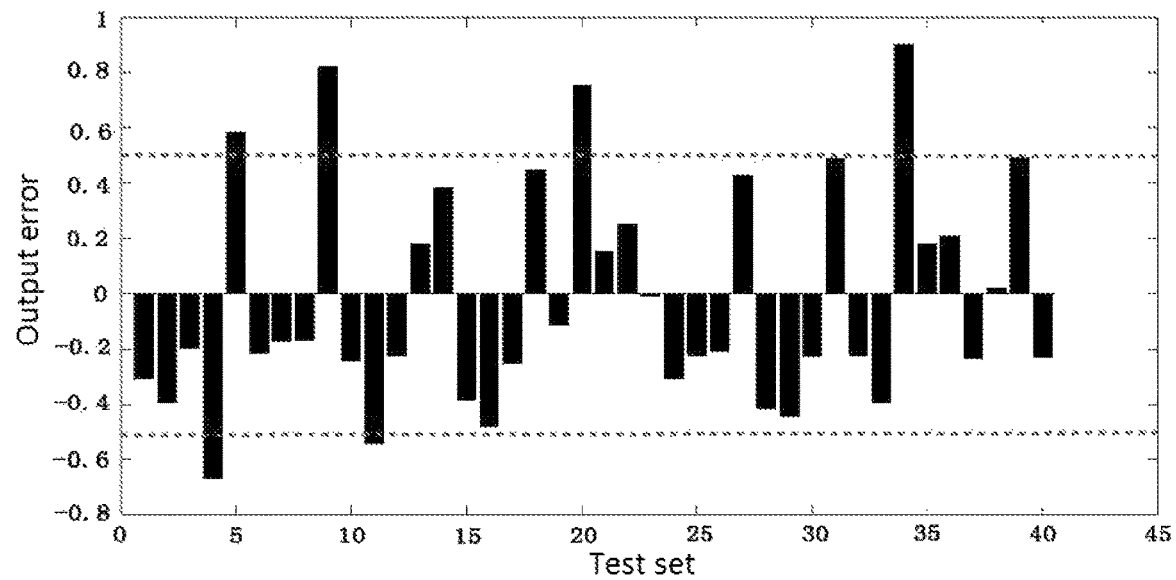
FIG. 6 is an output error diagram of a predicted output value and an expected value of a preset BP neural network model provided by an optional embodiment of the present application.

In the present embodiment, a comparison diagram and an output error diagram of the predicted output value and the expected value of the BP neural network obtained by taking 40 groups of training sets as the input are respectively shown as FIG. 3 and FIG. 4; and a comparison diagram and an output error diagram of the predicted output value and the expected value obtained by taking 40 groups of test sets as the input of the preset BP neural network model are respectively shown as FIG. 5 and FIG. 6.

Figure 7:
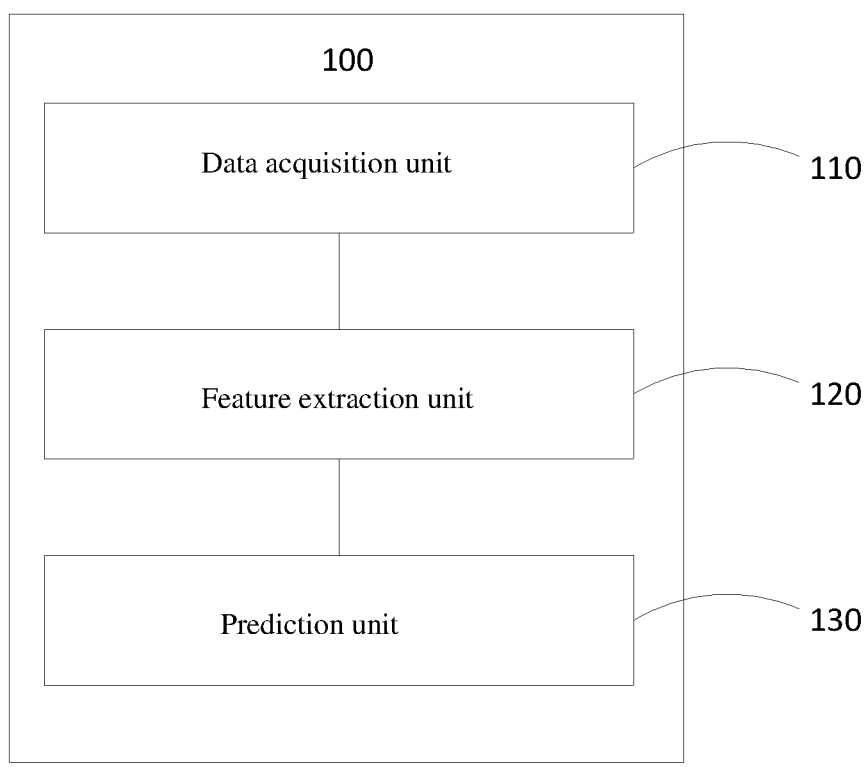
FIG. 7 is a block diagram of a prediction device for rock mass instability stages provided by an embodiment of the present application.

As shown in FIG. 7, embodiments of the present application further provide a prediction device 100 for rock mass instability stages, including:

a data acquisition unit 110, configured to acquire acoustic emission signals of rock mass;

a feature extraction unit 120, configured to extract feature parameters from the acquired acoustic emission signals; and a prediction unit 130, configured to predict instability stages of the rock mass in accordance with the feature parameters and a preset BP neural network model, wherein the preset BP neural network model is obtained by training a BP neural network and a genetic algorithm by virtue of the feature parameters of the acoustic emission signals at different rock mass instability stages.

The data acquisition unit 110, the feature extraction unit 120 and the prediction unit 130 are program modules. Division of each unit is only logical function division. Another division mode may exist during actual implementation. For example, multiple units may be integrated in one processing unit, or each unit may be in physical presence alone, or two or more than two units may be integrated in one unit.

Embodiments of the present application further provide a prediction system for rock mass instability stages, including:

an acoustic emission sensor connected to a network, and the prediction device 100 for rock mass instability stages connected to the network. Multiple acoustic emission sensors may be set and are used for acquiring acoustic emission signals of the rock mass. The data acquisition unit 110 of the prediction device 100 acquires the acoustic emission signals of the rock mass acquired by the acoustic emission sensor via the network. The network may be a wireless network or a wired network. When the network is the wired network, the network may be composed of corresponding buses.

Correspondingly, embodiments of the present application further provide a computer readable storage medium, wherein instructions are stored on the readable storage medium; and when the readable storage medium operates on a computer, the prediction method for rock mass instability stages is executed by the computer.

The present application is described with reference to a flowchart and/or a block diagram of the method, device (system) and computer program products according to the embodiments of the present application. It should be understood that, each flow and/or block in the flowchart and/or the block diagram and a combination of the flows and/or blocks in the flowchart and/or the block diagram may be realized by the computer program instructions. These computer program instructions may be provided in processors of general-purpose computers, special-purpose computers, embedded processors or other programmable data processing equipment so as to produce a machine. Thus, a device used for realizing specified functions in one or more flows of the flowchart and/or one or more blocks of the block diagram is produced by the instructions executed by the processors of the computers or the other programmable data processing equipment.

These computer program instructions may also be stored in a computer readable memory that may guide the computers or the other programmable data processing equipment to operate in a specific manner. Thus, manufactures including an instruction device are produced by the instructions stored in the computer readable memory. The instruction device realizes the specified functions in the one or more flows of the flowchart and/or one or more blocks of the block diagram.

These computer program instructions may also be loaded onto the computers or the other programmable data processing equipment, so that a series of operating steps are executed on the computers or the other programmable equipment so as to produce processing realized by the computers, thereby providing a step of realizing the specified functions in the one or more flows of the flowchart and/or one or more blocks of the block diagram by the instructions executed on the computers or the other programmable equipment.

The optional embodiments of the present application are described above in detail in combination with drawings. However, the embodiments of the present application are not limited to specific details in the embodiments. Multiple simple modifications may be made to technical solutions of the embodiments of the present application within the scope of technical concept of the embodiments of the present application. These simple modifications belong to the protection scope of the embodiments of the present application.

In addition, it should be indicated that, various specific technical features described in the specific embodiments may be combined in any appropriate way without contradiction. To avoid unnecessary repetitions, various possible combinations are not described separately in the embodiments of the present application.

Those skilled in the art may understand that, the total or partial steps in the method realizing the embodiments may be completed by related hardware instructed by a program. The program is stored in one storage medium, including multiple instructions used for enabling a single-chip, a chip or a processor to execute the total or partial steps of the method in each embodiment of the present application. The above storage medium includes a USB flash disk, a mobile hard disk drive, a read-only memory (ROM), a random access memory (RAM), a diskette or an optical disc and other media in which program codes may be stored.

The invention claimed is:

1. A prediction method for rock mass instability stages, comprising the steps:
acquiring acoustic emission signals of rock mass obtained from one or more sensors;
extracting feature parameters from the acquired acoustic emission signals; and
predicting instability stages of the rock mass in accordance with the feature parameters and a preset back propagation (BP) neural network model, wherein the preset BP neural network model is obtained by training a BP neural network and a genetic algorithm by virtue of the feature parameters of the acoustic emission signals at different rock mass instability stages;
wherein extracting feature parameters from the acquired acoustic emission signals comprises: dividing the acoustic emission signals acquired in the rock mass instability process into four stages according to rock mass stress conditions as follows:
a stage I compaction stage;
a stage II elastic deformation stage;
a stage III plastic deformation stage; and
a stage IV post-peak failure stage; and
extracting feature parameters from the acoustic emission signals at the four stages respectively;
wherein a training process of the preset BP neural network model comprises the following steps:
acquiring acoustic emission signals of different rock mass instability stages and extracting feature parameters of the acoustic emission signals of different rock mass instability stages;
dividing all the extracted feature parameters of the acoustic emission signals of different rock mass instability stages into a training set and a test set;
training the BP neural network in accordance with the training set and the genetic algorithm so as to obtain an initial BP neural network model; and
verifying the initial BP neural network model according to the test set, thereby obtaining the preset BP neural network model;
wherein a process of obtaining the initial BP neural network model comprises the steps:
determining the number of nodes in an input layer and an output layer of the BP neural network model in accordance with categories of the feature parameters in the training set and the rock mass instability stages;
determining the number of nodes in a hidden layer of the BP neural network in accordance with cut-and-trial;
initializing a weight and a threshold of the BP neural network;
optimizing the weight and threshold of the BP neural network by virtue of the genetic algorithm; and
training the BP neural network in accordance with the feature parameters in the training set and the corresponding rock mass instability stages, acquiring an error between a predicted output value and an expected output value of the BP neural network, and updating the weight and the threshold of the BP neural network by virtue of back propagation until the error between the predicted output value and the expected output value is smaller than a first set value, thereby obtaining the initial BP neural network model,
wherein a process of optimizing the weight and threshold of the BP neural network by virtue of the genetic algorithm comprises the steps:
setting population parameters comprising population size, evolution frequency, crossover probability and mutation probability;
conducting real number encoding on parameters of the BP neural network to obtain chromosome individuals, wherein the parameters comprise the weight and the threshold of the BP neural network, a length of each of the chromosome individuals meets the following formula: $L=n\times m+m\times s+m+s$, wherein L is the chromosome length; n is the number of nodes in the input layer; m is the number of nodes in the output layer; and s is the number of nodes in the hidden layer; and
calculating fitness of individuals, selecting an optimal individual from the current population according to the fitness of individuals, executing crossover and mutation operations until optimization conditions are met to obtain optimum weight and threshold, and using the optimum weight and threshold to update the initial weight and threshold of the BP neural network.

2. The prediction method for rock mass instability stages according to claim 1, wherein the preset BP neural network model is of a single-input single-output structure.

3. The prediction method for rock mass instability stages according to claim 1, wherein the feature parameters of the acoustic emission signals of different rock mass instability stages are ring-down count or energy count.

4. The prediction method for rock mass instability stages according to claim 1, wherein the fitness of individuals is inversely proportional to the error between the predicted output value and the expected output value of the initial BP neural network model.

5. A prediction device for rock mass instability stages, comprising a memory and a processor, the processor being configured to:
  acquire acoustic emission signals of rock mass obtained from one or more sensors;
  extract feature parameters from the acquired acoustic emission signals; and
  predict instability stages of the rock mass in accordance with the feature parameters and a preset BP back propagation (BP) neural network model, wherein the preset BP neural network model is obtained by training a BP neural network and a genetic algorithm by virtue of the feature parameters of the acoustic emission signals at different rock mass instability stages;
  wherein extracting feature parameters from the acquired acoustic emission signals comprises:
    dividing the acoustic emission signals acquired in the rock mass instability process into four stages according to rock mass stress conditions as follows:
      a stage I compaction stage;
      a stage II elastic deformation stage;
      a stage III plastic deformation stage, and
      a stage IV post-peak failure stage; and
      extracting feature parameters from the acoustic emission signals at the four stages respectively;
  wherein a training process of the preset BP neural network model comprises the following steps:
    acquiring acoustic emission signals of different rock mass instability stages and extracting feature parameters of the acoustic emission signals of different rock mass instability stages;
    dividing all the extracted feature parameters of the acoustic emission signals of different rock mass instability stages into a training set and a test set;
    training the BP neural network in accordance with the training set and the genetic algorithm so as to obtain an initial BP neural network model; and
    verifying the initial BP neural network model according to the test set, thereby obtaining the preset BP neural network model;
  wherein a process of obtaining the initial BP neural network model comprises the steps:
    determining the number of nodes in an input layer and an output layer of the BP neural network model in accordance with categories of the feature parameters in the training set and the rock mass instability stages;
    determining the number of nodes in a hidden layer of the BP neural network in accordance with cut-and-trial;
    initializing a weight and a threshold of the BP neural network;
    optimizing the weight and threshold of the BP neural network by virtue of the genetic algorithm; and
    training the BP neural network in accordance with the feature parameters in the training set and the corresponding rock mass instability stages, acquiring an error between a predicted output value and an expected output value of the BP neural network, and updating the weight and the threshold of the BP neural network by virtue of back propagation until the error between the predicted output value and the expected output value is smaller than a first set value, thereby obtaining the initial BP neural network model;
  wherein a process of optimizing the weight and threshold of the BP neural network by virtue of the genetic algorithm comprises the steps:
    setting population parameters comprising population size, evolution frequency, crossover probability and mutation probability;
    conducting real number encoding on parameters of the BP neural network to obtain chromosome individuals, wherein the parameters comprise the weight and the threshold of the BP neural network, a length of each of the chromosome individuals meets the following formula: $L=n\times m+m\times s+m+s$, wherein L is the chromosome length; n is the number of nodes in the input layer; m is the number of nodes in the output layer; and s is the number of nodes in the hidden layer; and
    calculating fitness of individuals, selecting an optimal individual from the current population according to the fitness of individuals, executing crossover and mutation operations until optimization conditions are met to obtain optimum weight and threshold, and using the optimum weight and threshold to update the initial weight and threshold of the BP neural network.

6. A prediction system for rock mass instability stages, comprising:
  an acoustic emission sensor connected to a network; and
  the device according to claim 5 connected to the network, wherein the data acquisition unit of the device acquires acoustic emission signals of rock mass acquired by the acoustic emission sensor via the network.

* * * * *